United States Patent [19]

Habegger

[11] 4,257,352
[45] Mar. 24, 1981

[54] PROTOZOAN MARINE LIFE INHIBITOR
[75] Inventor: William Habegger, Pittsburgh, Pa.
[73] Assignee: Ronald J. Randazza, Penn Hills, Pa.; a part interest
[21] Appl. No.: 29,302
[22] Filed: Apr. 12, 1979
[51] Int. Cl.³ .................... A01K 63/04; C02F 1/72
[52] U.S. Cl. ................................. 119/5; 204/149; 210/169
[58] Field of Search .............. 119/5, 3; 210/169, 243; 204/149, 275

[56] References Cited
U.S. PATENT DOCUMENTS

| | | | |
|---|---|---|---|
| 2,889,275 | 6/1959 | Moore | 210/169 X |
| 3,576,426 | 4/1971 | Sesholtz | 119/5 X |
| 3,891,535 | 6/1975 | Wikey | 204/149 X |
| 3,965,008 | 6/1976 | Dawson | 210/243 X |

Primary Examiner—Hugh R. Chamblee
Attorney, Agent, or Firm—Harold A. Williamson

[57] ABSTRACT

This invention relates to a protozoan marine life inhibitor system for use with a marine aquarium. The system includes first, second and third conduits, a pump and an electrolytic protozoan marine life inhibitor unit. The first conduit is in communication with water in the aquarium and the pump. The second conduit is interconnected between the pump and the electrolytic protozoan marine life inhibitor for delivery of water from the aquarium through the first conduit, the pump and the second conduit to the electrolytic protozoan marine life inhibitor unit. The third conduit is connected to the electrolytic protozoan marine life inhibitor and is positioned to receive and return water to the marine aquarium. The electrolytic marine life inhibitor includes an alternating current power source and a pair of spaced apart electrodes electrically connected to the alternating current power source. The spaced electrodes are positioned within a chamber of the marine life inhibitor unit such that the water flows through the chamber of the electrolytic protozoan marine life inhibitor unit and between the electrodes, whereby protozoan life forms carried by the water have their continued growth terminated.

5 Claims, 3 Drawing Figures

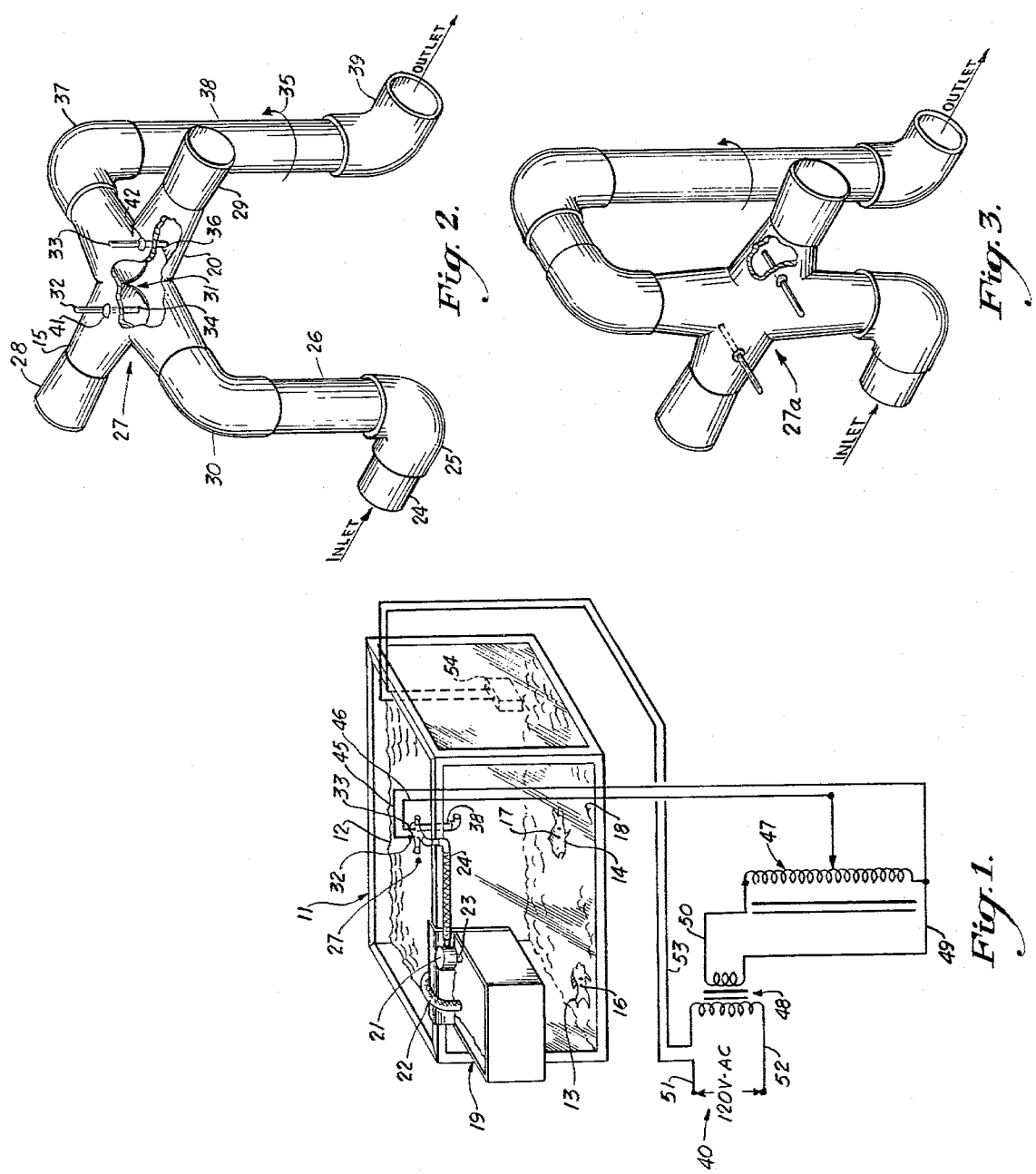

PROTOZOAN MARINE LIFE INHIBITOR

This invention relates to a protozoan marine life inhibitor system.

More specifically this invention relates to a protozoan marine life inhibitor system for use in combination with a marine aquarium containing water. The system includes first, second and third conduits, a pump and an electrolytic protozoan marine life inhibitor unit. The first conduit is in communication with the water of the aquarium and the pump. The second conduit is interconnected between the pump and the electrolytic protozoan marine life inhibitor for delivery of water from the aquarium through the first conduit, the pump and the second conduit to the electrolytic protozoan marine life inhibitor unit. The third conduit is connected to the electrolytic protozoan marine life inhibitor and is positioned to receive and return water to the marine aquarium. The electrolytic marine life inhibitor includes an alternating current power source and a pair of spaced apart electrodes electrically connected to the alternating current power source. The spaced electrodes are positioned within a chamber of the marine life inhibitor unit such that the water flows through the chamber of the electrolytic protozoan marine life inhibitor unit and between the electrodes, whereby protozoan life forms carried by the water have their continued growth terminated.

Interest in tropical fish and their care in home and commercial aquariums has never been greater than that which now exist throughout the world. While fresh water tropical fish aquariums have dominated the majority of home aquariums, more and more people are turning to the marine tropical fish which require a saline or salt water environment. The physical well being of these marine or salt water tropical fish have spawned a plethora of filters, water purifying systems and medicines to treat the water and hence the fish from a number of life threatening water carried protozoan life forms. The physical well being of the fish are dependent upon a number of ecological factors all of which must be controlled artificially within the aquarium. The factors of particular importance are water, temperature, oxygen, pH and salinity. If these factors are controlled within predetermined ranges the fish thrive. Unfortunately, the conditions that cause fish to thrive also cause water bourne protozoans to thrive. Protozoa are unicellular creatures. They have well defined "head" and "tail" regions, cilia of flagella and special organelles for feeding, excretion, light reception and other functions. The protozoa of special interest are generically designated as phylum Cnedosporidia of which there are about 1,000 species. These are fish parasites which are spore like and contain a polar capsule with a thread that anchors the protozoan parasites to the host fish during the infective process. The most common parasitic protozoan that is found infesting private and commercial aquariums are the species designated Ichthyophthirius. The Ichthyophthirius protozoa experience in its growth a rapid sequence of binary divisions, called palintomy where giant ciliate encysts on the host fish and undergoes many fissions without growth to produce numerous small ciliates. The life cycle of this parasitic ciliate includes periods of growth during which the reproductive cycle is inhibited, which alternate with periods of repeated reproduction when no growth takes place. The life cycle of these protozoa characteristically involves a trophont or feeding stage, during which the ciliate grows without dividing. This is followed by a stage of division (tomont), usually in a cyst, during which a number of small ciliated tomites are produced; these tomites do not feed, but swim away and encyst on a host fish. During the trophont or tomite stages prior art devices have been called upon to effect the termination of the protozoans life cycle. The most common approach utilizes an ultra violet (UV) light source which is directed into a region of the water from the aquarium after the water has been filtered. The prior art devices also provide separate water heating elements in the same region to maintain the aquarium water at the ideal temperature for the fish. A major deficiency of the UV light approach is the requirement that the water being treated move at a relatively slow rate beneath the UV light. When the UV light is positioned to treat filtered water, the system's capacity to turn over the water in the aquarium is limited to the flow permissible with a given UV light source. The UV light source utilized in these aquarium water purifier systems do not allow the use of high volume pumping. Moreover, the UV light sources are large and the apparatus used to shield and house the UV light is bulky and unsightly. When one adds to the limited life of the UV light source that the UV light source strength tends to diminish with age, we complete a picture of the prior art that demands improvement.

The invention to be described hereinafter meets this demand and its use in an aquarium system produces unexpected results that set a new standard for excellence in the inhibition of protozoan life forms in aquariums.

It is therefore a primary object of this invention to provide a protozoan marine life inhibitor system that utilizes a pair of electrodes connected to a power source and positioned in a stream of water to terminate the protozoan life forms in the water passing between the electrodes.

Another object of this invention is to provide a protozoan marine life inhibitor that is compact in size and can optimally treat large volumes of water traveling at high rates.

Yet another object of this invention is to provide a protozoan marine life inhibitor which simultaneously acts as a water heater for the aquarium being serviced, thereby doing away with the need for a separate water heater for the aquarium.

Still yet another object of this invention is to provide a protozoan marine life inhibitor that for reason not fully comprehended maintains the pH of the water treated stable, while simultaneously enhancing the growth of algae even in the absence of sun light.

A final object of this invention is to provide a protozoan marine life inhibitor the use of which precludes the need to treat the water of the aquarium with copper, formalin and sulfa drugs, which can have adverse side effects on the host fish who are sought to be cured of their protozoan infestation.

In the attainment of the foregoing objects, the protozoan marine life inhibitor is used in combination with a marine aquarium containing water which is saline in composition. The system includes first, second, third conduits and a pump all interconnected to an electrolytic protozoan marine life inhibitor unit. The first conduit is in communication with the aquarium's water and the pump. The second conduit is interconnected between the pump and the electrolytic protozoan marine life inhibitor for delivery of water from the aquarium through the first conduit, the pump and the second conduit to the electrolytic protozoan marine life inhibitor unit. The third conduit is connected to the electrolytic protozoan marine life inhibitor unit and is positioned to receive and return the water to the aquarium. Specifically, the electrolytic marine life inhibitor includes an alternating current power source, which may be variable in nature. A pair of spaced apart electrodes are electrically connected to the alternating current power source. The spaced apart electrodes are positioned within a chamber such that the water carrying the protozoan life forms flows through the chamber and between the electrodes, whereby the protozoan life forms carried by the water have their continued growth terminated.

A preferred embodiment of the invention located the aforementioned chamber above the level of the water in the aquarium and has the electrodes positioned within the chamber at right angles to the water flow. The power level and frequency of the alternating current power source is sufficient to cause the generation of heat in water passing through the chamber and hence the aquarium water while simultaneously terminating the continued growth of the protozoan life forms.

Another embodiment includes in combination a heat limit control unit, which is positioned in the aquarium to sense the water temperature and is electrically connected to the alternating current power source to interrupt power to the electrodes whenever the water in the aquarium reaches a predetermined temperature.

Other objects and advantages of this present invention will become apparent from the ensuing description of illustrative embodiments thereof, in the course of which reference is had to the accompanying drawings in which:

FIG. 1 illustrates in three dimensional form a typical marine aquarium in which the protozoan marine life inhibitor containing the invention is shown.

FIG. 2 depicts a preferred embodiment of the invention shown in partial section.

FIG. 3 illustrates a second embodiment of the invention shown with a partial section.

Reference is now made to FIG. 1 in which there is illustrated an environment in which the invention finds utility. There is designated by arrow 11 a marine aquarium 11. Whenever the term marine is used hereinafter it is intended to convey the idea that a "salt water" environment is to be understood as being present and not a "fresh water" environment. The marine aquarium 11 therefore, contains salt water 12 and in this salt water 12 are fish 13, 14. These fish 13, 14 will from time to time be referred to as host fish for the parasitic protozoans 16, 17 shown infesting these host fish 13, 14. The bottom of the aquarium 11 is conventionally covered with a medium of sand and shells 18. This medium of sand and shell 18 becomes a repository of protozoans during their various stages of growth. It will be better understood as the description hereinafter unfolds that the salt water 12 is experiencing continuous movement as a result of the filter unit 19 with its pump 21 which is connected through the filter unit 19 to a filter intake conduit 22. The pump 21 delivers a stream of water from the filter unit 19 and its pump 21 via a first conduit 23, a second conduit 24, an electrolytic marine life inhibitor unit 27 and finally, a third conduit 38.

The electrolytic marine life inhibitor 27 of FIG. 1 is shown in greater detail in FIG. 2 and a complete description of the electrolytic marine life inhibitor unit 27 will follow when FIG. 2 is described in detail hereinafter.

A pair of electrodes 32, 33 can be seen protruding from the electrolytic marine life inhibitor unit 27. A power source 40 in the form of 120 volts A.C. is shown in the left hand corner of FIG. 1. While the preferred embodiment employs 60 cycle current, the invention contemplates higher frequency levels where the protozoan life forms are not affected by the 60 cycle power. This power source 40 is electrically coupled to the electrodes 32, 33 via a step down transformer 48, a variable auto transformer 47 and a heat limit control unit 54. The heat limit control unit is in fact a thermostat that causes a circuit interruption whenever the temperature of the water 12 surrounding the heat limit control unit 54 rises above a predetermined temperature level. A pair of electrical leads 51, 53 connected across the heat limit control unit 54 serially connect the heat limit control unit 54 with one end of the step down transformer 48. An electrical lead 52 connects the power source 40 to the other side of the step down transformer 48. Electrical leads 49, 50 connected across the secondary side of the step down transformer 48 are in turn connected to a variable auto transformer 47. The variable auto transformer 47 is in turn electrically connected to electrodes 32, 33 via electrical leads 45, 46 respectively. It should be understood that this invention does not require the presence of a variable auto transformer 47 as long as the step down transformer has been selected of a ratio that is appropriate for the electrode size and spacing and the rate of flow in the electrolytic marine life inhibitor. The parameters involved in respect of electrode size, spacing and flow rate will be discussed more fully hereinafter.

Attention is now directed to FIG. 2 which sets forth in amplified detail a preferred embodiment of the electrolytic marine life inhibitor containing the invention. A second conduit 24 which is connected to the pump 21 receives and carries filtered water from the filter unit 19. A conduit elbow 25 receives the second conduit 24 as well as a second conduit extension 26. An elbow 30 receives in turn the second conduit extension 26. The electrolytic marine life inhibitor 27 has generally a cross-shaped configuration as can best be seen in FIG. 2. The cross-shaped electrolytic marine life inhibitor 27 has cross arms 15, 20 which are sealed by caps 28, 29. The remaining cross arms not indicated by reference numerals fit into conduit elbows 30 and 37. The arrangement just described and shown in FIG. 2 provides a chamber 31 where the cross arms meet. This chamber 31 can be seen in the cut away section of FIG. 2.

There is also shown a pair of electrodes 32, 33 which pass through the wall of cross-shaped electrolytic marine life inhibitor 27 and are positioned as shown on either side of the chamber 31. The positioning of these electrodes in a perpendicular relationship to the flow of water through the chamber is important to the efficient operation of the invention. The cross-shaped configuration of the electrolytic marine life inhibitor is not critical so long as a chamber of sufficient dimension is provided in which electrodes 32, 33 may be positioned to allow the passage of water there between. The electrodes 32, 33 pass through opening not numbered in the walls of the cross-shaped member and are sealed in their passage there through by sealant material 41, 42. The electrodes 32, 33 are fitted in an opposite wall of the cross-shaped member in electrode seat openings 34, 36.

Though not mentioned until this point the material of which the various conduits and elbows are constructed are of a suitable plastic. The preferred embodiment of this invention shows a plurality of conduits and elbows. Although not stated heretofore, each elbow and conduit is bonded to the cooperating conduit with a suitable waterproof sealant. The invention, however, contemplates that all the structure illustrated might at the option of a manufacturer be comprised of single ejection molded piece or other fabrication technique. The invention as shown illustrates the most inherently variable construction technique available that would allow creation of the invention with readily available components. The electrodes 32, 33 are carbon rods not unlike that which can be found in any dry cell battery once the surrounding battery materials were removed.

Continuing with the description of FIG. 2, the elbow 37 has secured thereto a third conduit 38 which has fitted at its lower end an elbow 39. In this embodiment the elbow 39 is shown positioned with only a friction fit which allows the elbow 39 to be rotated as shown by arrow 35. The elbow 39 forms an outlet and a return to the aquarium 11.

The operation of the system incorporating the invention will now be set forth with as great a detail and theory as is presently comprehended. At the outset it should be noted that the exact electrical and physiological phenomenon that occurs in the water passing between the electrodes 32, 33 and within the microscopic marine life is not fully understood. The fact that protozoan life forms that undergo a life altering experience is irrefutably present as endless testing has proven. Because of the uncertainty of an exact and provable theory as to why the phenomenal results occur as set forth in the objectives, the description that follows will detail the exact physical and electrical environment that has proven successful. It is to be understood that this invention is not to be limited to the description that follows as it is intended to be typical of a best mode presently contemplated.

Before continuing a brief comment will be made in respect of FIG. 3 which shows another embodiment of the invention. In this FIG. 3 it can be seen that were the entire arrangement illustrated placed over the wall of an aquarium the cross-shaped electrolytic marine life inhibitor 27a would be positioned along side the outer wall of the aquarium. The following are reasons for these alternative locations. As has been noted earlier water 12 from the aquarium 11 is delivered through the filter 19 and then delivered by pump 21 to the second conduit 24 and the electrolytic marine life inhibitor 27. On occasion the filter 19 becomes clogged and the flow of water through the electrolytic marine life inhibitor is brought to a standstill. When this occurs the water passing between the electrodes 32, 33 will experience a continuous static heating of the water disposed there between. This static water heating may result in damage to the plastic housing of the cross-shaped eletrolytic marine life inhibitor 27. In some filter-pump units the clogging of the filter results in pump drawing air into the system through the seals of the pump. This air when delivered to the electrolytic marine life inhibitor provides an interruption in the fluid column of water passing there through which results in the chamber 31 of the electrolytic marine life inhibitor 27 emptying. The absence of water between the electrodes 32, 33 removes the static heating of the water and therefore the problem.

There are marine fish devotees that do not like the appearance of the electrolytic marine life inhibitor unit with the exposed electrodes and related electrical leads visable on the top edge of the aquarium wall and for these the unit may take the configuration shown in FIG. 3. The location of the electrolytic marine life inhibitor does not affect the dynamics of its operation.

How does the electrolytic marine life inhibitor work? Does it kill out right the microscopic trophont and tomite swimming stages of the parisitic protozoans? It would be easy to say that these life forms had their life stage ended by electrocution. This conclusion in respect of electrocution has not been supported by any documental evidence of the physiological changes that occur with the trophont and tomite protozoan life forms. It is known, however, with absolute certainty that these trophont and tomite life forms of protozoans are ended with continuous treatment of the aquarium's water.

The use of the word electrolytic may be a misnomer but has been selected as the closest known expression which describes the phenomenon that occurs where a pair of electrodes are placed in a salt bearing solution. The electrical current is alternating and there is no generation of gases at the electrodes. The chemical characteristics of the salt water passing between the electrodes is a subject of conjecture. The consequences of impressing an electrical field across the water carrying the protozoan life forms is irrefutable. These protozoan life forms disappear from the aquarium as is evidenced by the introduction of an infected host fish into a tank with other uninfested fish. Without the presence of the invention the infested fish eventually becomes weakened and dies and the remaining fish become infested and if not treated with medication die. The incorporation of the invention in the filtering system begins to produce results within days and within weeks the complete eradication of the parasitic protozoan infestion. Infested host fish can be visually observed as infested by the sighting of small generally white colored cysts on the fishes scales. For reason not fully comprehended these cysts within a few weeks are gone.

More will be said hereinafter of the additional phenomenon that occur when the invention is actively present in a marine aquarium.

At this time the details of physical and electrical parameter involved in this most successful contribution to the healing arts of marine life will be set forth.

In an aquarium of the 20 to 30 gallon capacity with a pump 21 of 150–200 gallons per minute and a water salinity of 1020 would require of the step down transformer 48 be of the isolation type that can handle a base minimum of 20 volt/ampere continuously. The electrodes 32, 33 are one sixteenth inch carbon rods. These electrodes are long lived and tend not to wear out or burn out. The electrolytic marine life inhibitor chamber 27, 27a as shown in FIG. 2 and FIG. 3 is made of one half inch polyvinyl chloride (PVC) plastic. The electrodes 32, 33 are spaced one half inch apart and each expose an area of electrode of approximately one half inch to the water passing there between. It has been as observed that as the electrode area decreases and rate of water flow increases past the electrodes the inhibition of marine life passing through the chamber is enhanced.

In every unit there is of course a level of current flow, electrode size, spacing and rate of water flow where the current passing through the water causes the water to vaporize.

The presence of heat liberated to the water as the water passes between the electrodes allows the invention to simultaneously inhibit marine life forms continued growth while heating the water. This heating of the water does away with need for the aquarium to have a separate water heater. In the environment being described the incorporation of the invention in conjunction with the heat limit control unit 54 of FIG. 1 allows for maintaining water temperature through the liberation of approximately 20 watts of power in heat continuously. The heating of the water is a readily understood phenomenon and a scientific explanation is not offered.

In addition to the primary function of the invention, namely the termination of parasitic protozoan life forms there arise at least two beneficial results that appear to escape an elementary explanation. The first phenomena concerns itself with the pH of the water undergoing treatment. In most tanks the pH of the water falls over a period of time unless some action such as stirring the gravel bed of the aquarium and frequent water changes occur. The use of the invention causes the water to hold stable at a pH of 8.0 to 8.2 for long periods of time. A stable pH in the aquarium's water is essential to the health and well being of the fish. It should also be recognized that a constant ideal pH not only enhances the fishes health but the parasitic protozoans as well. The parasitic protozoans in this ideal environment find their lives terminated rather than enhanced by the use of the invention.

A remaining unexplained phenomena concerns itself with enhanced algae growth in aquariums employing the invention, even when the aquariums are remote from any sunlight. The algae appears to grow rapidly and is lush in its appearance. Artificial light is all that is needed. The lush growth of algae cover everything in the aquarium. Also unexplained is the sudden falling apart of the algae after it has reached and maintained its lush state of growth. The falling apart of the algae is always followed by a return to the rapid growth of the algae.

While the present invention has been illustrated and disclosed in connection with the details of the illustrative embodiments thereof, it should be understood that those illustrative embodiments are only to be limitative of the invention as set forth in the accompanying claims.

What I claim as new is as follows:

1. A protozoan marine life inhibitor system for use in combination with a marine aquarium containing saline water, said system including
   first, second and third conduit means,
   pump means, and
   an electrolytic protozoan marine life inhibitor means,
   said first conduit means in communication with said saline water and said pump,
   said second conduit means interconnected between said pump and said electrolytic protozoan marine life inhibitor for delivery of saline water from said aquarium through said first conduit means said pump means and said second conduit means to said electrolytic protozoan marine life inhibitor means,
   said third conduit means connected to said electrolytic protozoan marine life inhibitor means and positioned to receive and return said saline water to said marine aquarium,
said electrolytic marine life inhibitor means including an
   alternating current power source and a pair of spaced apart rod shaped electrodes electrically connected to said alternating current power source, said spaced apart rod shaped electrodes are positioned within a chamber positioned above the level of said aquarium water such that said saline water flows through said chamber of said electrolytic protozoan marine life inhibitor means and at right angles to said rod shaped electrodes,
   said alternating current power source provides power of a level sufficient to heat said water flowing through said chamber,
   a heat limit control means responsive to the temperature of said aquarium water and controllably electically connected to said alternating current power source to interrupt said alternating current power to said electrolytic protozoan marine life inhibitor means whenever the temperature of said water exceeds a predetermined level, whereby protozoan life forms carried by said saline water have their continued growth terminated, and said saline water temperature is maintained at said predetermined level.

2. The protozoan marine life inhibitor system of claim 1, wherein said electrodes are carbon rods.

3. The protozoan marine life inhibitor system of claim 1 which includes air bleed means to said chamber to provide said chamber with air should said pump operation be interrupted thereby ensuring water within said chamber can drain into said aquarium whereby over heating of said water in the region of said electrodes is avoided.

4. The protozoan marine life inhibitor system of claim 3 which includes in combination a filter means coupled to said pump means to thereby filter said water prior to said water's flow through said chamber.

5. The protozoan marine life inhibitor system of claim 3 where said alternating current power source is variably adjustable.

* * * * *